UNITED STATES PATENT OFFICE.

CARL LUCKOW, OF COLOGNE, GERMANY.

PROCESS FOR REGENERATING ELECTRIC ACCUMULATORS.

No. 915,980.

Specification of Letters Patent.

Patented March 23, 1909.

Application filed May 9, 1905. Serial No. 259,620.

*To all whom it may concern:*

Be it known that I, CARL LUCKOW, a subject of the German Emperor, and resident of Cologne, Germany, have invented certain new and useful Improvements in Processes for Regenerating Electric Accumulators, of which the following is a specification.

The process protected by the German Patent No. 105,143 for the electrolytic recovery of insoluble or slightly soluble oxids or salts and metals or metalloids from insoluble oxids and so on, has been applied to the present process for the purpose of rendering electric accumulators, whose capacity diminishes in consequence of impurities or shrinking of its effective mass, or for any other reason, in spite of overloading, again susceptible to store up electric currents, that is to say to regenerate them, at a small consumption of energy in from 1 to 2 weeks, so that the now very costly, troublesome and wearisome exchanging of rotten electrodes by new ones is done away with, and the expenses are thereby reduced to at least one tenth.

The process will be explained by the example given in the following: An electric storage battery, whose positive electrodes consist of ribbed or grated plates of soft lead with lead peroxid as a filling whose negative electrodes of ribbed or grated plates are of soft or hard lead with spongy lead as a filling, and whose electrolyte consists of diluted sulfuric acid, shows a dwindling of the capacity in consequence of the sulfation of the active filling masses, that is to say pollution of the latter by sulfate of lead, as well as in consequence of solidification of the spongy lead which shows itself by cracks in the mass and by the separation of the latter from its support. Instead of replacing these rotten electrode-plates by new ones and thus restoring the original capacity, this is attained in a much simpler and far more rational and quite as sure way by the present process, as the same effects a perfect loosening of the shrunk mass, therefore a closing of the cracks and reëstablishing of the contact with the support and also a thorough cleaning of the active mass, by rendering soluble the sulfate of lead. In this way the sulfuric acid is first pumped out of the cells, and after a sufficient dripping of the electrodes the bottoms of the cells are, as far as possible, disacidified by being rinsed with water. The cells are then filled with a watery solution of about 1 to 2 per cent. of sulfate of potassium, sodium or magnesium or the carbonates, borates or hydroxids of potassium or sodium, or a mixture of the carbonates, borates or hydroxids with the sulfate of potassium or sodium as an electrolyte; there is to be remarked here that the carbonate, borate or hydroxid of potassium or sodium passes over into the sulfate of potassium or sodium immediately on entering the cells, by the sulfuric acid remaining in the same and especially in the electrodes, but in any case in the course of the process by the disintegration of the plumbic sulfate, so that the sulfate of potassium or sodium forms at all events the most important electrolytic salt, the carbonate, borate or hydroxid of potassium or sodium is therefore merely used for the binding or neutralizing of the free or nascent sulfuric acid, as the electrolyte also in the course of the electrolysis may only become slightly acid.

According to the degree of the rottenness, or of the dwindling of the capacity, of the electrodes, the latter are subjected as follows to the electrolysis with a current density of from 20 to about 50 amperes per square meter of positive electrode surface, with a tension of bath of, on an average, 2 volts: At first the current passes the cells or respectively the battery for about 4 to 8 days in a direction the opposite of that of a charge, so that the negative pole plates become anodes and the positive pole plates cathodes; during this time the solidified and sulfatized spongy lead is, on the one hand, changed into pure plumbic peroxid, while perfectly closing the cracks and establishing the contact with its supports, and, on the other hand, the sulfatized plumbic peroxid is changed into pure spongy lead; in consequence of the sulfate being disintegrated its nascent sulfuric acid is dissolved and is accumulated in the electrolyte, whereby its preponderating or at least almost neutral and, in rare cases, feebly alkaline reaction is changed into a feebly acid reaction. Then the poles are inversed again, and in another 3 to about 6 days the plumbic peroxid is, on the one hand, changed again into pure, loose, spongy lead and, on the other, the spongy lead into pure plumbic peroxid, whereby the regeneration is finished. The solution of salt is therefore caused to run out of the cells and the latter are filled again, as soon as possible, with sulfuric acid. With the second or third discharge after the sulfuric acid has again thoroughly saturated the active masses, the standard capacity is, as a rule attained.

The amounts of salt mentioned in the description of the example for carrying out the process relate to salts free of water. The method described in the example has proven to be the best and most rapid but solutions containing more than 2 per cent. of salt may be used and a good result obtained. Experiments have, however, shown that the salt-solutions must not be stronger than 5 per cent. if it is desired to get a satisfactory result.

It will thus be seen that the main feature of the new invention consists in using electrolyte-substances as electrolytes in a strong watery solution in which the electrolytic or hydrolytic dissociation of the dissolved substances is of as high degree as possible, while the solutions have still a good conductivity for practical purposes. As, however, the practical maximum of the electrolytic or hydrolytic dissociation is the same as the relative maximum of the chemical reaction-capacity (energy, intensity) of the electrolyte, it will be understood that the loss in capacity of an electric accumulator, which results from a sulfation and shrinking of the active masses, can be done away with rapidly, thoroughly and profitably by the use of the present process, as the loosening and cleaning force of the galvanic current at and in the electrodes on which, of course, the formation of oxids or active mass exclusively depends, increases in the same proportion as the density of the electrolyte decreases. Only with strongly diluted electrolyte is it possible to thoroughly convert lead sulfates into lead super-oxid and spongy lead and to loosen condensed lead to form spongy lead. When a concentrated electrolyte is used, this action takes place only on the surface. Therefore, the mere use of a watery solution, for instance, of sodium sulfate ($Na_2SO_4$) as electrolyte does not accomplish the purpose, as in this case, it is not the sort of electrolyte-substance but only the dilution of the same, that is to say, not the salt $Na_2SO_4$ but only the density of its watery solution, that brings the result. The electrolyte, therefore, must not contain more than 1% to 3% at an average and under no circumstances more than 5% dissolved electrolyte-substance, the latter always relating to neutral salt without water. As electrolyte - substances, the salts—including hydroxids—of the so-called light metals in as far as their being soluble in water and their chemical properties permits of their being used, are generally useful.

A strong sulfuric acid reaction of the electrolytes is to be avoided by partial or complete renewal of the same, or by dilution of the same with water, or by neutralization with the carbonate or hydroxid of potassium or sodium in their correspondingly strong watery solutions, or by other suitable measures. Generally speaking the more diluted the electrolyte is the stronger an acid reaction is permissible. The free sulfuric acid (free of water) must however at the most amount to about 10 grams in each liter of the electrolyte.

What I claim as my invention and desire to secure by United States Letters Patent is—

1. The process of regenerating electric accumulators which consists in subjecting the electrodes to electrolysis in a greatly diluted non-acid electrolyte.

2. The process of regenerating electric accumulators, which consists in subjecting the electrodes to electrolysis in a watery solution containing 1 to 5% of a non-acidic electrolyte substance.

3. The process of regenerating electric accumulators, which consists in subjecting the electrodes to electrolysis in a greatly diluted electrolyte of a neutral salt of a light metal.

4. The process of regenerating electric accumulators, which consists in subjecting the electrodes to electrolysis in a dilute solution of a neutral electrolytic substance.

In testimony whereof I affix my signature.

CARL LUCKOW.

In the presence of—
WILLIAM KUEPPERS,
TOH SCHOLEY.